United States Patent
Kozlowski et al.

(10) Patent No.: US 11,650,473 B2
(45) Date of Patent: May 16, 2023

(54) OPTICAL DEVICES WITH ASYMMETRIC LAYER STRUCTURE

(71) Applicant: VIAVI SOLUTIONS INC., San Jose, CA (US)

(72) Inventors: Mark Kozlowski, Windsor, CA (US); Johannes P. Seydel, Petaluma, CA (US); Jaroslaw Zieba, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 691 days.

(21) Appl. No.: 16/450,426

(22) Filed: Jun. 24, 2019

(65) Prior Publication Data

US 2020/0004101 A1  Jan. 2, 2020

Related U.S. Application Data

(60) Provisional application No. 62/691,874, filed on Jun. 29, 2018.

(51) Int. Cl.

| | | |
|---|---|---|
| *C09C 1/00* | (2006.01) | |
| *C09D 5/33* | (2006.01) | |
| *G02F 1/17* | (2019.01) | |
| *G02B 26/08* | (2006.01) | |
| *G02F 1/00* | (2006.01) | |
| *G02F 1/19* | (2019.01) | |
| *G02B 1/06* | (2006.01) | |
| *G02B 1/10* | (2015.01) | |
| *G02B 5/26* | (2006.01) | |

(52) U.S. Cl.
CPC .............. *G02F 1/17* (2013.01); *C09C 1/0015* (2013.01); *C09C 1/0021* (2013.01); *C09C 1/0078* (2013.01); *G02B 26/0816* (2013.01); *G02F 1/0036* (2013.01); *G02F 1/19* (2013.01); *C09D 5/004* (2013.01); *G02B 1/06* (2013.01); *G02B 1/10* (2013.01); *G02B 5/26* (2013.01)

(58) Field of Classification Search
CPC ... C09C 1/0015; C09C 1/0021; C09C 1/0078; C09D 5/004
See application file for complete search history.

(56) References Cited

U.S. PATENT DOCUMENTS

| | | | |
|---|---|---|---|
| 6,565,770 B1 * | 5/2003 | Mayer | B82Y 10/00 106/403 |
| 6,596,070 B1 * | 7/2003 | Schmidt | C03C 17/3417 106/417 |
| 2003/0195270 A1 * | 10/2003 | Ishii | C08K 5/0025 522/71 |
| 2004/0101676 A1 | 5/2004 | Phillips et al. | |
| 2004/0166308 A1 * | 8/2004 | Raksha | C08K 9/02 428/329 |
| 2005/0018272 A1 | 1/2005 | Kimura | |
| 2014/0210200 A1 * | 7/2014 | Bornschlegl | C09C 1/0021 283/85 |
| 2016/0333526 A1 | 11/2016 | Macpherson et al. | |
| 2017/0368866 A1 * | 12/2017 | Seydel | B42D 25/328 |
| 2017/0369709 A1 | 12/2017 | Seydel et al. | |
| 2017/0369970 A1 | 12/2017 | Seydel et al. | |

FOREIGN PATENT DOCUMENTS

| | | |
|---|---|---|
| CN | 1505668 A | 6/2004 |
| CN | 1748874 | 3/2006 |
| EP | 3266835 | 1/2018 |
| JP | H0136891 Y2 | 11/1989 |
| JP | 2001-325745 | 11/2001 |
| JP | 2004512394 A | 4/2004 |
| KR | 10-20020071955 | 9/2002 |
| KR | 10-2004-0018469 | 3/2004 |
| KR | 10-2010-0138974 | 12/2010 |
| KR | 10-20180001505 | 1/2018 |

* cited by examiner

*Primary Examiner* — Pegah Parvini
(74) *Attorney, Agent, or Firm* — Mannava & Kang, P.C.

(57) ABSTRACT

An article includes a reflector having a first surface, a second surface opposite the first surface, and a third surface; and a first selective light modulator layer external to the first surface of the reflector; wherein the third surface of the reflector is open. A method of making an article is also disclosed.

20 Claims, 3 Drawing Sheets

OPTICAL DEVICES WITH ASYMMETRIC LAYER STRUCTURE

RELATED APPLICATION

The present application claims priority to U.S. Provisional Application No. 62/691,874, filed on Jun. 29, 2018, the disclosure of which is hereby incorporated by reference in its entirety.

FIELD OF THE INVENTION

The present disclosure generally relates to articles, such as optical devices in the form of foil, sheets, and/or flakes. The optical devices can include a reflector having a first surface; and a first selective light modulator layer ("SLML") external to the first surface reflector. The optical device can also include a transparent layer having a first surface; and a first SLML external to the first surface of the transparent layer. Methods of making the optical devices are also disclosed.

BACKGROUND OF THE INVENTION

A variety of optical devices, including flakes are used as a feature of consumer applications with enhanced optical properties. In some consumer applications, a metallic effect with low to no color shift and an optically varying effect is desirable. Unfortunately, present manufacturing methods, result in optical devices that are not sufficiently chromatic and/or do not provide a sufficiently strong metallic flop. Other methods require a multilayer paint system which increases the cost of manufacturing and does not to work within the industry's standard manufacturing equipment.

SUMMARY OF THE INVENTION

In an aspect, there is disclosed an article comprising a reflector having a first surface, a second surface opposite the first surface, and a third surface; and a first selective light modulator layer external to the first surface of the reflector; wherein the third surface of the reflector is open.

In an aspect, there is disclosed an article comprising a transparent layer having a first surface, a second surface opposite the first surface, and a third surface; and a first selective light modulating layer external to the first surface of the transparent layer; wherein the third surface of the transparent layer is open.

In another aspect, there is disclosed a method for manufacturing an article comprising depositing a reflector layer; and depositing a first selective light modulator layer; wherein the first selective light modulator layer is deposited using a liquid coating process.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. In its broad and varied embodiments, disclosed herein are articles, such as optical devices, for example, in the form of foils, sheets, and flakes; and a method of manufacturing the article. In an example, the articles including optical devices, such as pigments, optical taggants, and optical security devices can be manufactured with a simplified construction and reduced layer count thereby reducing the manufacturing cost. Additionally, the articles having a flake-like form can offer higher aspect ratio particles thereby offering a better alignment and enhanced optical properties. Further, the asymmetric layer structure can provide a flake in which the opposite sides of the flake can provide different visual and non-visual attributes.

As used herein, "reflect" and it variants refer to reflection of light. As used herein, "absorb" and its variants refer to absorption of light.

The articles 10 illustrated in the Figures can exhibit a property chosen from optical interference, light absorption, light reflection, light scattering, and combinations thereof. The article 10 disclosed herein can, in some aspects, exhibit optical interference. Alternatively, in some examples, the article 10 cannot exhibit optical interference. In an aspect, the article 10 can exploit interference to generate color. In another aspect, the article 10 cannot exploit interference to generate color. For example, as described in further detail below, the appearance of color can be generated by including a selective light modulator system (SLMS), such as an additive, a selective light modulator particle (SLMP) or a selective light modulator molecule (SLMM) in a selective light modulator layer (SLML).

In an aspect, the article 10 can be in a form of a sheet that can be used on an object or a substrate. In another aspect, the article 10 can be in a form of a foil or flake. For example, the article 10 can have a lamellar shape. In an aspect, an optical device can include an article 10. In another aspect, a composition can include the optical device and a liquid medium. The composition can be an ink, a varnish, a paint, etc. In another aspect, the article 10 is an optical device in the form of a flake, for example having 100 nm to 100 μm in thickness and 100 nm to 1 mm in size. The article 10 can be a color shifting colorant, or can be used as a security feature for currency. Some attributes common to use of the article 10 can include high chromaticity (or strong color), color change with respect to viewing angle (also known as goniochromaticity or iridescence), and flop (a specular and metallic appearance that varies in lightness, hue, or chromaticity as the viewing angle varies). Additionally, the article 10 can be metallic in color and cannot exploit interference to generate color.

Although the Figures illustrate an article 10, such as an optical device, in the form of a sheet, the article 10, such as an optical device can also be in a form of a flake, and/or a foil, according to various aspects of the present disclosure. Additionally, although the Figures illustrate specific layers in specific orders, one of ordinary skill in the art would appreciate that the article 10 can include any number of layers in any order. Additionally, the composition of any particular layer can be the same or different from the composition of any other layer. For example, a first selective light modulator layer (SLML) can be the same or different composition than a second selective light modulator layer (SLML). Further, the physical properties of any particular layer can be the same or different from the physical properties of any other layer. For example, a first SLML 14 can have a composition with a first refractive index, but a second SLML 14' in the same article 10 can have a different composition with a different refractive index. As another example, a first SLML 14 can have a composition at a first thickness, but the second SLML 14' can have the same composition at a second thickness different from the first thickness.

Figure 1:
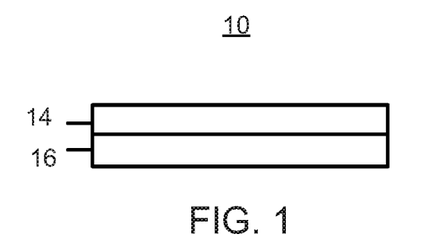
FIG. 1 is a cross-sectional view of an article according to an aspect of the present disclosure.

As illustrated in FIG. 1, the article 10 can include a reflector 16 having a first surface, a second surface opposite the first surface, and a third surface; and a first selective light modulator layer 16 external to the first surface of the reflector 16; wherein the third surface of the reflector 16 is open.

Reflector 16 can be a wideband reflector, e.g., spectral and Lambertian reflector (e.g., white $TiO_2$). Reflector 16 can be a metal, non-metal, or metal alloy. In one example, the materials for the reflector 16 can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Other reflective materials can also be used in place of aluminum. For example, copper, silver, gold, platinum, palladium, nickel, cobalt, niobium, chromium, tin, and combinations or alloys of these or other metals can be used as reflective materials. In an aspect, the material for the reflector 16 can be a white or light colored metal. In other examples, reflector 16 can include, but is not limited to, the transition and lanthanide metals and combinations thereof; as well as metal carbides, metal oxides, metal nitrides, metal sulfides, a combination thereof, or mixtures of metals and one or more of these materials.

The thickness of the reflector 16 can range from about 5 nm to about 5000 nm, although this range should not be taken as restrictive. For example, the lower thickness limit can be selected so that reflector 16 can provide a maximum transmittance of 0.8. Additionally, or alternatively, for a reflector 16 including aluminum the optical density (OD) can be from about 0.1 to about 4 at a wavelength of about 550 nm.

In order to obtain a sufficient optical density and/or achieve a desired effect, a higher or lower minimum thicknesses can be required depending of the composition of reflector 16. In some examples, the upper limit can be about 5000 nm, about 4000 nm, about 3000 nm, about 1500 nm, about 200 nm, and/or about 100 nm. In one aspect, the thickness of the reflector 16 can range from about 10 nm to about 5000 nm for example, from about 15 nm to about 4000 nm, from about 20 nm to about 3000 nm, from about 25 nm to about 2000 nm, from about 30 nm to about 1000 nm, from about 40 nm to about 750 nm, or from about 50 nm to about 500 nm, such as from about 60 nm to about 250 nm or from about 70 nm to about 200 nm.

As shown in the Figures, at least two surfaces/sides of reflector 16, for example, the right (third) and left (fourth) surface/side as shown, can be free of SLML 14. In an aspect, if the article 10 is in the form of a flake or foil, then reflector 16 can include more than the four surfaces exemplified in the Figures. In those instances, for example, one, two, three, four, or five surfaces of reflector 16 can be free of SLML 14. In some examples, one, two, three, four, or five surfaces of reflector 16, and therefore article 10, can be open to the air. In an example, open sides, i.e., surfaces of the reflector 16 that do not contain an external SLML 14, can be an advantage for flop.

Referring back to FIG. 1, the article 10 can include a first selective light modulator layer (SLML) 14 external to the first surface of the reflector 16. The SLML is a physical layer comprising a plurality of optical functions aiming at modulating (absorbing and or emitting) light intensity in different, selected regions of spectrum of electromagnetic radiation with wavelengths ranging from about 0.2 μm to about 20 μm. The article 10 of FIG. 1 includes an asymmetric layer structure in which the SLML 14 can selectively modulate light by means of absorption provided by a selective SLMS (discussed in more detail below). In particular, the article 10 can include a SLML 14 that selectively absorbs specific wavelengths of energy, such as light.

A SLML 14 (and/or the materials within the SLML 14) can selectively modulate light. For example, an SLML 14 can control the amount of transmission in specific wavelengths. In some examples, the SLML 14 can selectively absorb specific wavelengths of energy (e.g., in the visible and/or non-visible ranges). For example, the SLML 14 can be a "colored layer" and/or a "wavelength selective absorbing layer." In some examples, the specific wavelengths absorbed can cause the article 10 to appear a specific color. For example, the SLML 14 can appear red to the human eye (e.g., the SLML 14 can absorb wavelengths of light below approximately 620 nm and thus reflect or transmit wavelengths of energy that appear red). This can be accomplished by adding selective light modulator particles (SLMP) that are colorants (e.g., organic and/or inorganic pigments and/or dyes) to a host material, such as a dielectric material, including but not limited to a polymer. For example, in some instances, the SLML 14 can be a colored plastic.

In some examples, some or all of the specific wavelengths absorbed can be in the visible range (e.g., the SLML 14 can be absorbing throughout the visible, but transparent in the infrared). The resulting article 10 would appear black, but reflect light in the infrared. In some examples described above, the wavelengths absorbed (and/or the specific visible color) of the article 10 and/or SLML 14 can depend, at least in part, on the thickness of the SLML 14. Additionally, or alternatively, the wavelengths of energy absorbed by the SLML 14 (and/or the color in which these layers and/or the flake appears) can depend in part on the addition of certain aspects to the SLML 14. In addition to absorbing certain wavelengths of energy, the SLML 14 can achieve at least one of bolstering the reflector 16 against degradation; enabling release from a substrate; enabling sizing; providing some resistance to environmental degradation, such as oxidation of aluminum or other metals and materials used in the reflector 16; and high performance in transmission, reflection, and absorption of light based upon the composition and thickness of the SLML 14'.

In some examples, in addition to or as an alternative to the SLML 14 selectively absorbing specific wavelengths of energy and/or wavelengths of visible light, the SLML 14 of the article 10 can control the refractive index and/or the SLML 14 can include SLMPs that can control refractive index. SLMPs that can control the refractive index of the SLML 14 can be included with the host material in addition to or as an alternative to an absorption controlling SLMPs (e.g., colorants). In some examples, the host material can be combined with both absorption controlling SLMPs and refractive index SLMPs in the SLML 14. In some examples, the same SLMP can control both absorption and refractive index.

The performance of the SLML 14 can be determined based upon the selection of materials present in the SLML 14. In an aspect, the SLML 14 can improve at least one of the following properties: flake handling, corrosion, alignment, and environmental performance of any other layers within article 10, e.g., the reflector 16.

The first and (optionally second, third, fourth, etc.) SLML 14 can each independently comprise a host material alone, or a host material combined with a selective light modulator system (SLMS). In an aspect, at least one of the first SLML 14 can include a host material. In another aspect, at least one of the first SLML 14 can include a host material and a SLMS. The SLMS can include a selective light modulator molecule (SLMM), a selective light modulator particle (SLMP), an additive, or combinations thereof.

The composition of the SLML 14 can have a solids content ranging from about 0.01% to about 100%, for example from about 0.05% to about 80%, and as a further example from about 1% to about 30%. In some aspects, the solids content can be greater than 3%. In some aspects, the composition of the SLML 14 can have a solids content ranging from about 3% to about 100%, for example from about 4% to 50%.

The host material of the first SLML 14 can independently be a film forming material applied as a coating liquid and serving optical and structural purposes. The host material can be used as a host (matrix) for introducing, if necessary, a guest system, such as the selective light modulator system (SLMS), for providing additional light modulator properties to the article 10.

The host material can be a dielectric material. Additionally or alternatively, the host material can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The first SLML 14 can include from about 0.001% to about 100% by weight of a host material. In an aspect, the host material can be present in the SLML 14 in an amount ranging from about 0.01% to about 95% by weight, for example from about 0.1% to about 90%, and as a further example from about 1% to about 87% by weight of the SLML 14.

The SLMS, for use in the SLML 14 with the host material, can each independently comprise selective light modulator particles (SLMP), selective light modulator molecules (SLMM), additives, or a combination thereof. The SLMS can also comprise other materials. The SLMS can provide modulation of the amplitude of electromagnetic radiation (by absorption, reflectance, fluorescence etc.) in a selective region or the entire spectral range of interest (0.2 µm to 20 µm).

The first SLML 14 can each independently include in an SLMS a SLMP. The SLMP can be any particle combined with the host material to selectively control light modulation, including, but not limited to color shifting particles, colorants including dyes, pigments, reflective pigments, color shifting pigments, quantum dots, and selective reflectors. Non-limiting examples of a SLMP include: organic pigments, inorganic pigments, quantum dots, nanoparticles (selectively reflecting and/or absorbing), micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$—SnO, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Examples of a SLMM include but are not limited to: organic dyes, inorganic dyes, micelles, and other molecular systems containing a chromophore.

In some aspects, SLMS of the first SLML 14 can include at least one additive, such as a curing agent, and a coating aid.

The curing agent can be a compound or material that can initiate hardening, vitrification, crosslinking, or polymerizing of the host material. Non-limiting examples of a curing agent include solvents, radical generators (by energy or chemical), acid generators (by energy or chemical), condensation initiators, and acid/base catalysts.

Non-limiting examples of the coating aid include leveling agents, wetting agents, defoamers, adhesion promoters, antioxidants, UV stabilizers, curing inhibition mitigating agents, antifouling agents, corrosion inhibitors, photosensitizers, secondary crosslinkers, and infrared absorbers for enhanced infrared drying. In an aspect, the antioxidant can be present in the composition of the SLML 14 in an amount ranging from about 25 ppm to about 5% by weight.

The first SLML 14 can each independently comprise a solvent. Non-limiting examples of solvents can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the first SLML 14' in an amount ranging from about 0% to about 99.9%, for example from about 0.005% to about 99%, and as a further example from about 0.05% to about 90% by weight relative to the total weight of the SLML 14.

In some examples, the first SLML 14 can include a composition having at least one of (i) a photoinitiator, (ii) an oxygen inhibition mitigation composition, (iii) a leveling agent, and (iv) a defoamer.

The oxygen inhibition mitigation composition can be used to mitigate the oxygen inhibition of the free radical material. The molecular oxygen can quench the triplet state of a photoinitiator sensitizer or it can scavenge the free radicals resulting in reduced coating properties and/or uncured liquid surfaces. The oxygen inhibition mitigation composition can reduce the oxygen inhibition or can improve the cure of any SLML 14'.

The oxygen inhibition composition can comprise more than one compound. The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the first SLML 14 in an amount ranging from about 5% to about 95%, for example from about 10% to about 90%, and as a further example from about 15% to about 85% by weight relative to the total weight of the SLML 14'.

In some examples, the host material of the SLML 14 can use a non-radical cure system such as a cationic system. Cationic systems are less susceptible to the mitigation of the oxygen inhibition of the free radical process, and thus may not require an oxygen inhibition mitigation composition. In an example, the use of the monomer 3-Ethyl-3-hydroxymethyloxetane does not require an oxygen mitigation composition.

In an aspect, the first SLML 14 can each independently include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The SLML 14 can include only Type I photoinitiators, only Type II photoinitiators, or a combination of both Type I and Type II photoinitiators. The photoinitiator can be present in the composition of the SLML 14 in an amount ranging from about 0.25% to about 15%, for example from about 0.5% to about 10%, and as a further example from about 1% to about 5% by weight relative to the total weight of the composition of the SLML 14.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide. The bis acyl phosphine oxide can be a bis (2,4,6-trimethylbenzoyl)phenylphosphineoxide. In an aspect, at least one phosphineoxide can be present in the composition of the SLML 14. For example, two phosphineoxides can be present in the composition of the SLML 14.

A sensitizer can be present in the composition of the SLML 14 and can act as a sensitizer for Type 1 and/or a Type II photoinitiators. The sensitizer can also act as a Type II photoinitiator. In an aspect, the sensitizer can be present in the composition of the SLML 14 in an amount ranging from about 0.05% to about 10%, for example from about 0.1% to about 7%, and as a further example from about 1% to about 5% by weight relative to the total weight of the composition of the SLML 14. The sensitizer can be a thioxanthone, such as 1-chloro-4-propoxythioxanthone.

In an aspect, the SLML 14 can include a leveling agent. The leveling agent can be a polyacrylate. The leveling agent can eliminate cratering of the composition of the SLML 14. The leveling agent can be present in the composition of the SLML 14 in an amount ranging from about 0.05% to about 10%, for example from about 1% to about 7%, and as a further example from about 2% to about 5% by weight relative to the total weight of the composition of the SLML 14.

The first SLML 14 can also include a defoamer. The defoamer can reduce surface tension. The defoamer can be a silicone free liquid organic polymer. The defoamer can be present in the composition of the SLML 14 in an amount ranging from about 0.05% to about 5%, for example from about 0.2% to about 4%, and as a further example from about 0.4% to about 3% by weight relative to the total weight of the composition of the SLML 14.

The first SLML 14 can each independently have a refractive index of greater or less than about 1.5. For example, each SLML 14' can have a refractive index of approximately 1.5. The refractive index of each SLML 14 can be selected to provide a degree of color travel required wherein color travel can be defined as the change in hue angle measured in L*a*b* color space with the viewing angle. In some examples, each SLML 14' can include a refractive index in a range of from about 1.1 to about 3.0, about 1.0 to about 1.3, or about 1.1 to about 1.2. In some examples, the refractive index of each SLMLs 14 can be less than about 1.5, less than about 1.3, or less than about 1.2. In some examples, SLML 14 can have substantially equal refractive indexes or different refractive indexes one from the other, if more than one SLML is present in the article 10.

The first SLML 14 can have a thickness ranging from about 1 nm to about 10000 nm, about 10 nm to about 1000 nm, about 20 nm to about 500 nm, about 1 nm, to about 100 nm, about 10 nm to about 1000 nm, about 1 nm to about 5000 nm. In an aspect, the article 10, such as an optical device, can have an aspect ratio of 1:1 to 1:50 thickness to width.

One of the benefits of the articles 10 described herein, however, is that, in some examples, the optical effects appear relatively insensitive to thickness variations. Thus, in some aspects, each SLML 14 can independently have a variation in optical thickness of less than about 5%. In an aspect, each SLML 14 can independently include an optical thickness variation of less than about 3% across the layer. In an aspect, each SLML 14 can independently have less than about 1% variation in optical thickness across the layer having a thickness of about 50 nm.

Figure 2:
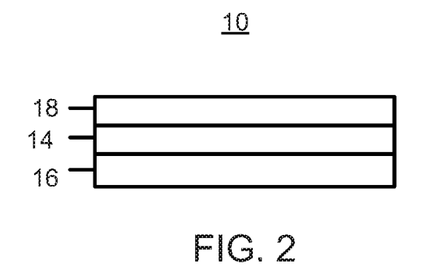
FIG. 2 is a cross-sectional view of an article according to another aspect of the present disclosure.

As illustrated in FIG. 2, the article 10 can also include a first absorber layer 18 external to the first selective light modulator layer 14; wherein the first selective light modulator layer 14 is at least one of non-absorbing and absorbing. For example, the first selective light modulator layer 14 can be absorbing. In another example, the first selective light modulator layer 14 can be non-absorbing. As a further example, the first selective light modular layer 14 can include alternating layers of absorbing SLML 14 and non-absorbing SLML 14.

With regard to FIG. 2, the article 10 can include a reflector 16 having a first surface, a second surface opposite the first surface; and a third surface; a first SLML 14 external to the first surface of the reflector 16, wherein the first SLML is non-absorbing; and a partial absorber 18 layer external to the first SLML 14. The article 10 in FIG. 2 can be an asymmetric layer structure having optical interference effects Also with regard to FIG. 2, the article 10 can include a reflector 16 having a first surface, a second surface opposite the first surface; and a third surface; a SLML 14 external to a first surface of the reflector 16 and including alternating layers of absorbing SLML and non-absorbing SLML; and an absorber layer 18 external to the first SLML 14. The absorber layer 18 can be a partial absorbing layer 18. In this aspect, a SLMS can be introduced directly into the optical layer that can be needed for a light interference design. The SLML 14 can change the amplitude of electromagnetic radiation by a combination of absorption and interference effects. In particular, the article 10 in FIG. 2 can also be an asymmetric layer structure having optical interference and absorbing effects.

Figure 3:
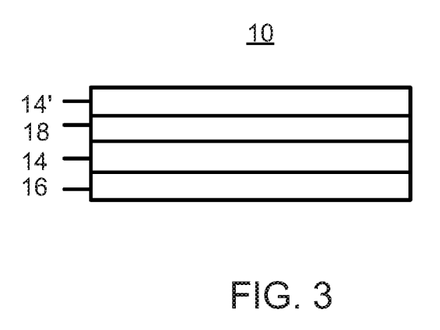
FIG. 3 is a cross-sectional view of an article according to another aspect of the present disclosure.

As illustrated in FIG. 3, the article 10 can also include a second light selective light modulator layer 14' external to the first absorber layer 18; wherein the first selective light modulator layer 14 can be non-absorbing and the second selective light modulator layer 14' is absorbing. In particular, the article 10 can include a reflector 16 having a first surface, a second surface opposite the first surface; and a third surface; a first SLML 14 external to a first surface of the reflector 16 and including a non-absorbing SLML; an absorber layer 18 external to the first SLML 14, in which the absorber layer is partially absorbing; and a second SLML 14' external to the absorber layer 18 in which the second SLML 14' is absorbing.

The material for the first absorber layer 18 can include any absorber material, including both selective absorbing materials and nonselective absorbing materials. For example, the first absorber layer 18 can be formed of nonselective absorbing metallic materials deposited to a thickness at which the absorber layer 18 is at least partially absorbing, or semi-opaque. An example of a non-selective absorbing material can be a gray metal, such as chrome or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials that may be used to form the absorber layer 18.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer 18 include, but are not limited to, titanium-based compounds such as titanium silicide ($TiSi_2$), titanium boride ($TiB_2$), and combinations thereof. Alternatively, the first absorber layer 18 can be composed of a titanium-based alloy disposed in a matrix of Ti, or can be composed of Ti disposed in a matrix of a titanium-based alloy. For example, the first absorber layer 18 can include chromium.

The first absorber layer 18 can also be formed of a magnetic material, such as a cobalt nickel alloy. This can simplify the manufacture of a magnetic color shifting device or structure by reducing the number of materials required.

The first absorber layer 18 can be formed to have a physical thickness in the range from about 1 nm to about 50 nm, such as from about 5 nm to about 10 nm, depending upon the optical constants of the absorber layer material and the desired peak shift. If more than one absorber layer 18 is present in an article 10, then each absorber layer 18 can be composed of the same material or a different material, and can have the same or different physical thickness for each layer.

Figure 4:
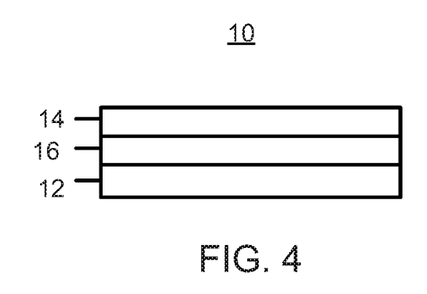
FIG. 4 is a cross-sectional view of an article according to another aspect of the present disclosure.

As illustrated in FIG. 4, the article 10 can further include a magnetic-containing layer 12 having a first surface and a second surface opposite the first surface; wherein the reflector layer 16 is external to the first surface of the magnetic-containing layer 12. In particular, the article 10 can include a reflector 16 having a first surface, a second surface opposite the first surface; and a third surface; a first SLML 14 external to the first surface of the reflector 16; and a magnetic-containing layer 12 having a first surface and a second surface opposite the first surface; wherein the reflector layer 16 is external to the first surface of the magnetic-containing layer 12. The article 10 can be absorbing asymmetric layer structure in which the SLML is augmented by an additional carrier that serves either a structural function or carries other visual or non-visual functions, such as magnetic, barrier, chemical, etc.

The magnetic-containing layer 12 can include magnetic permeable, magnetic orientable materials, magnetic materials, and combinations thereof. A magnet material, such as ferromagnetic and ferrimagnetic materials, includes but is not limited to, nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10%. Other examples of alloys include, but are not limited to, Fe/Si, Fe/Ni, Fe/Co, Fe/Ni/Mo, Fe/Cr, Ni/Cr, and combinations thereof. In an aspect, the magnetic-containing layer 12 can include a polymer containing iron oxide particles. Hard magnetics of the type $SmCo_5$, $NdCo_5$, $Sm_2Co_{17}$, $Nd_2Fe_{14}B$, $Sr_6Fe_2O_3$, $TbFe_2$, Al—Ni—Co, and combinations thereof, can also be used as well as spinel ferrites of the type $Fe_3O_4$, $NiFe_2O_4$, $MnFe_2O_4$, $CoFe_2O_4$, or garnets of the type YIG or GdIG, and combinations thereof. In an aspect, the magnetic material may be ferritic stainless steel. The magnetic material can be selected for its reflecting or absorbing properties as well as its magnetic properties. The magnetic-containing layer 12 can be formed by a material having magnetic and non-magnetic particles, or magnetic particle within non-magnetic medium, for example cobalt-doped zinc oxide film deposited using the sol-gel technology.

Although this broad range of magnetic materials can be used, "soft" magnets can be used in an aspect. As used herein, the term "soft magnets" refers to any material exhibiting ferromagnetic properties but having a remanence that is substantially zero after exposure to a magnetic force. Soft magnets can show a quick response to an applied magnetic field, but have very low (coercive fields (Hc)=0.05-300 Oersted (Oe)) or zero magnetic signatures, or retain very low magnetic lines of force after the magnetic field is removed. Similarly, as used herein, the term "hard magnets" (also called permanent magnets) refers to any material that exhibits ferromagnetic properties and that has a long lasting remanence after exposure to a magnetizing force. A ferromagnetic material is any material that has permeability substantially greater than 1 and that exhibits magnetic hysteresis properties. In an aspect, any magnetic material can be used in the magnetic-containing layer 12 so long as the material enables the orienting of the article 10.

The magnetic-containing layer 12 can have a thickness ranging from about 10 nm to about 100 nm, for example from about 35 nm to about 45 nm, and as a further example from about 40 nm. The magnetic-containing layer 12 can be deposited to a thickness so that it is substantially opaque. In an aspect, the magnetic-containing layer 12 can be deposited to a thickness so that it is not substantially opaque.

The magnetic-containing layer 12 can be formed using conventional deposition processes, such as physical vapor deposition techniques; as well as sputtering including magnetron sputtering; thermal evaporation; electron beam evaporation; and cathodic arc evaporation. In an aspect, the magnetic-containing layer 12 can also be formed using a liquid coating process.

Figure 5:
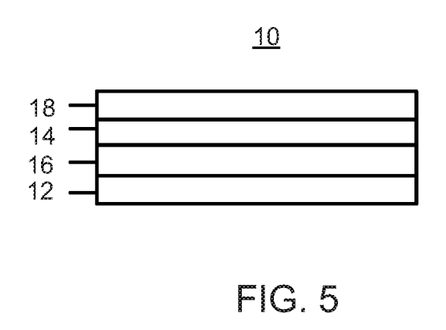
FIG. 5 is a cross-sectional view of an article according to another aspect of the present disclosure.

As illustrated in FIG. 5, the article 10 can further include a first absorber layer 18 external to the first SLML 14; wherein the first SLML 14 is non-absorbing. In particular, the article 10 can include a reflector 16 having a first surface, a second surface opposite the first surface; and a third surface; a first SLML 14 external to the first surface of the reflector layer 16; a magnetic-containing layer 12 having a first surface and a second surface opposite the first surface; wherein the reflector layer 16 is external to the first surface of the magnetic-containing layer 12; and a first absorber layer 18 external to the first SLML 14. In an aspect, the first SLML 14 is non-absorbing and the absorber layer 18 is partially absorbing thereby creating an article 10 with interference effects.

Figure 6:
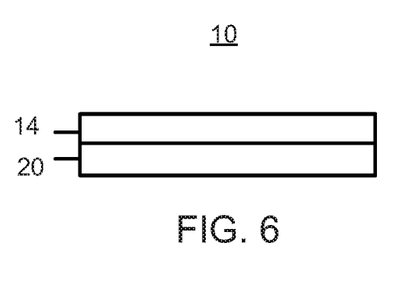
FIG. 6 is a cross-sectional view of an article according to another aspect of the present disclosure.
Figure 7:
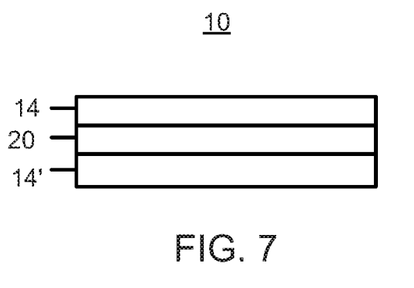
FIG. 7 is a cross-sectional view of an article according to another aspect of the present disclosure.

As illustrated in FIG. 6, the article 10 can include a transparent layer 20 having a first surface, a second surface opposite the first surface; and a third surface; and a first SLML 14 external to the first surface of the transparent layer 20; wherein the third surface of the transparent layer 20 is open. For example, the first SLML 14 can provide an absorbing red color. As illustrated in FIG. 7, the article 10 can further include a second SLML 14' external to the second surface of the transparent layer 20. For example, this article 10 can include two different absorbing SLML 14, 14' sandwiching a transparent layer 20. The first SLML 14 can be red in color and the second SLML 14' can be blue in color.

In another aspect, there is disclosed an article 10 include a reflector 16 having a first surface, a second surface opposite the first surface, and a third surface; a first SLML 14 external to the first surface of the reflector layer 16; and a second SLML 14' external to the second surface of the reflector layer 16. The first SLML 14 can be the same or different from the second SLML 14', for example, in terms of materials present in the layers and/or physical properties of each layer.

In an aspect, the article 10, such as an optical device in the form of a flake, foil or sheet, can also include a substrate and/or a release layer. In an aspect, the release layer can be disposed between the substrate and the article 10.

Additionally, or alternatively, the article 10 in the form of a flake, sheet, or foil can also include a hard coat or protective layer on the article 10. In some examples, these layers (hard coat or protective layer) do not require optical qualities.

The article 10, such as optical devices, described herein can be made in any way. For example, a sheet can be made and then divided, broken, ground, etc. into smaller pieces forming an optical device. In some examples, the sheet can be created by a liquid coating process, including, but not limited the processes described below and/or with respect to FIG. 8.

There is disclosed a method for manufacturing an article 10, for example in the form of a sheet, flake, or foil, as described herein. The methods described herein can be formed by depositing a layer on another layer. For example, a reflector lay 16 can be deposited on a substrate. As another example, a first selective light modulator layer 14 can be deposited on a reflector layer 16. It will also be appreciated that additional layers can be deposited between two identified layers. For example, although a reflector layer 16 can be deposited on a substrate, a magnetic-containing layer can be deposited between the reflector layer 16 and the substrate. One of ordinary skill in the art would appreciate that the layers would be "deposited on" or "deposited between" using a successive procedure, i.e., substrate, magnetic-containing layer, and reflector layer, using deposition techniques disclosed herein to, for example, make the articles 10 disclosed herein.

The method can comprise depositing a reflector layer 16; and depositing a first selective light modulator layer 14; wherein the first selective light modulator layer 14 is depositing using a liquid coating process. The method can further include depositing a first absorber layer 18; wherein the first selective light modulator layer 14 is at least one of non-absorbing and absorbing. Additionally, or alternatively, the method can further include depositing a second selective light modulator layer 14'; wherein the first selective light modulator layer 14 is non-absorbing.

Additionally, or alternatively, the method can further include depositing between the substrate and the reflector layer 16 a magnetic-containing layer 12. Additionally, or alternatively, in this aspect, the method can further include depositing a first absorber layer 18, wherein the first selective light modulator layer 14 is non-absorbing.

In another aspect, the method can comprise depositing a transparent layer 20; and depositing a first selective light modulator layer 14; wherein the first selective light modulator layer 14 is depositing using a liquid coating process. The method can further include depositing between the substrate and the transparent layer 20 a second selective light modulator system 14'. The first selective light modulator layer 14 and the second selective light modulator layer 14' can be the same or different, for example, in terms of material composition and/or physical properties.

In the methods, the substrate can comprise a release layer. In the disclosed methods, the layers, such as the transparent layer 20, the reflector layer 16, the absorber layer 18, and/or the magnetic-containing layer 20 can be deposited using known conventional deposition process, such as physical vapor deposition, chemical vapor deposition, thin-film deposition, atomic layer deposition, etc., including modified techniques such as plasma enhanced and fluidized bed.

The substrate can be made of a flexible material. The substrate can be any suitable material that can receive the deposited layers. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 µm to about 100 µm, and as a further example from about 10 to about 50 µm.

The first and/or second SLML 14, 14' can be deposited by a liquid coating process, such as a slot die process. The liquid coating process can include, but is not limited to: slot-bead, slide bead, slot curtain, slide curtain, in single and multilayer coating, tensioned web slot, gravure, roll coating, and other liquid coating and printing processes that apply a liquid on to a substrate or previously deposited layer to form a liquid layer or film that is subsequently dried and/or cured.

The substrate can then be released from the deposited layers to create the article 10. In an aspect, the substrate can be cooled to embrittle an associated release layer, if present. In another aspect, the release layer could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be sized into article 10, such as an optical device in the form of a flake, foil, or sheet, using known techniques.

In another aspect, the deposited layers can be transferred from the substrate to another surface. The deposited layers can be punched or cut to produce large flakes with well-defined sizes and shapes.

The liquid coating process can allow for the transfer of the composition of the SLML 14, 14' at a faster rate as compared to other deposition techniques, such as vapor deposition. Additionally, the liquid coating process can allow for a wider variety of materials to be used in the SLML 14, 14' with a simple equipment set up. It is believed that the SLML 14, 14' formed using the disclosed liquid coating process can exhibit improved optical performance.

Figure 8:
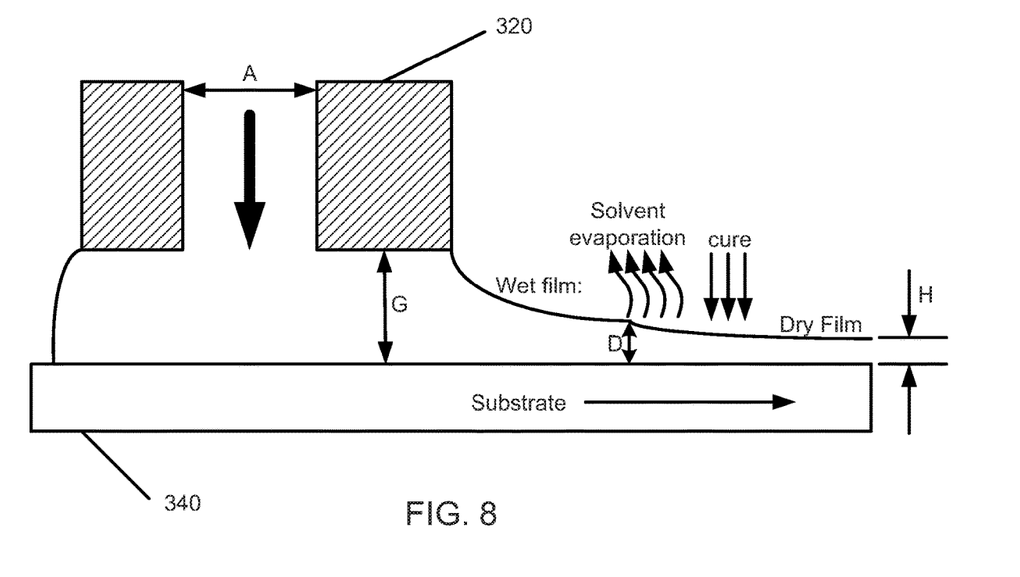
FIG. 8 is a cross sectional view of a liquid coating process showing deposition of a layer, such as an SLML layer, according to an example of the present disclosure.

FIG. 8 illustrates the formation of the SLML 14, 14' using a liquid coating process. The composition of the SLML (a liquid coating composition) can be inserted into a slot die 320 and deposited on a substrate 340 resulting in a wet film. With reference to the processes disclosed above, the substrate 340 can include at least one of a substrate, a release layer, a transparent layer 20, a reflector layer 16, an absorber layer 18, and previously deposited layers. The distance from the bottom of the slot die 320 to the substrate 340 is the slot gap G. As can be seen in FIG. 8, the liquid coating composition can be deposited at a wet film thickness D that is greater than a dry film thickness H. After the wet film of the SLML 14, 14' has been deposited on the substrate 340, any solvent present in the wet film of the SLML 14, 14' can be evaporated. The liquid coating process continues with curing of the wet film of the SLML 14, 14' to result in a cured, self-leveled SLML 14, 14' having the correct optical thickness H (ranging from about 30 to about 700 nm). It is believed that the ability of the SLML 14, 14' to self-level results in a layer having a reduced optical thickness variation across the layer. Ultimately, an article 10, such as an optical device, comprising the self-leveled SLML 14, 14' can exhibit increased optical precision. For ease of understanding, the terms "wet film" and "dry film" will be used to refer to the composition at various stages of the liquid coating process that results in the SLML 14, 14'.

The liquid coating process can comprise adjusting at least one of a coating speed and a slot gap G to achieve a wet film with a predetermined thickness D. The SLML 14, 14' can be deposited having a wet film thickness D ranging from about 0.1 µm to about 500 µm, for example from about 0.1 µm to about 5 µm. The SLML 14,14' formed with a wet film thickness D in the disclosed range can result in a stable SLML layer, such as a dielectric layer, i.e., without breaks or defects such as ribbing or streaks. In an aspect, the wet film can have a thickness of about 10 µm for a stable wet film using a slot die bead mode with a coating speed up to about 100 m/min. In another aspect, the wet film can have a thickness of about 6-7 µm for a stable wet film using a slot die curtain mode with a coating speed up to about 1200 m/min.

The liquid coating process can include a ratio of slot gap G to wet film thickness D of about 1 to about 100 at speeds from about 0.1 to about 1000 m/min. In an aspect, the ratio is about 9 at a coating speed of about 100 m/min. In an aspect, the ratio can be about 20 at a coating speed of about 50 m/min. The liquid coating process can have a slot gap G ranging from about 0 to about 1000 µm. A smaller slot gap G can allow for a reduced wet film thickness. In slot-bead mode higher coating speeds can be achieved with a wet film thickness greater than 10 µm.

The liquid coating process can have a coating speed ranging from about 0.1 to about 1000 m/min, for example from about 25 m/min to about 950 m/min, for example from about 100 m/min to about 900 m/min, and as a further example from about 200 m/min to about 850 m/min. In an aspect, the coating speed is greater than about 150 m/min, and in a further example is greater than about 500 m/min.

In an aspect, the coating speed for a bead mode liquid coating process can range from about 0.1 m/min to about 600 m/min, and for example from about 50 to about 150 m/min. In another aspect, the coating speed for a curtain mode liquid coating process can range from about 200 m/min to about 1500 m/min, and for example, from about 300 m/min to about 1200 m/min.

As shown in FIG. 8 the solvent can be evaporated from the wet film, such as before the wet film is cured. In an aspect, about 100%, for example about 99.9%, and as a further example about 99.8% of the solvent can be evaporated from the composition of the SLML 14, 14', prior to curing of the SLML 14, 14'. In a further aspect, trace amounts of solvent can be present in a cured/dry SLML 14, 14'. In an aspect, a wet film having a greater original weight percent of solvent can result in a dry film having a reduced film thickness H. In particular, a wet film having a high weight percent of solvent and being deposited at a high wet film thickness D can result in a SLML 14, 14' having a low dry film thickness H. It is important to note, that after evaporation of the solvent, the wet film remains a liquid thereby avoiding problems such as skinning, and island formation during the subsequent curing steps in the liquid coating process.

The dynamic viscosity of the wet film can range from about 0.5 to about 50 cP, for example from about 1 to about 45 cP, and as a further example from about 2 to about 40 cP. The viscosity measurement temperature is 25° C., the rheology was measured with an Anton Paar MCR 101 rheometer equipped with a solvent trap using a cone/plate 40 mm diameter with 0.3° angle at a gap setting of 0.025 mm.

In an aspect, the composition of the SLML 14, 14' and the solvent can be selected so that the wet film exhibits Newtonian behavior for precision coating of the SLMLs using the liquid coating process. The wet film can exhibit Newtonian behavior shear rates up to 10,000 $s^{-1}$ and higher. In an aspect, the shear rate for the liquid coating process can be 1000 $s^{-1}$ for a coating speed up to 25 m/min, for example 3900 $s^{-1}$ for a coating speed up to 100 m/min, and as a further example 7900 $s^{-1}$ for a coating speed up to 200 m/min. It will be understood that a maximum shear rate can occur on a very thin wet film, such as 1 μm thick.

As the wet film thickness is increased, the shear rate can be expected to decrease, for example decrease 15% for a 10 μm wet film, and as a further example decrease 30% for a 20 μm wet film.

The evaporation of the solvent from the wet film can cause a change in viscosity behavior to pseudoplastic, which can be beneficial to achieve a precision SLML. The dynamic viscosity of the deposited first and second SLML 14, 14', after any solvent has been evaporated, can range from about 10 cP to about 3000 cP, for example from about 20 cP to about 2500 cP, and as a further example from about 30 cP to about 2000 cP. When evaporating the solvent, if present, from the wet film there can be an increase in viscosity to the pseudoplastic behavior. The pseudoplastic behavior can allow for self-leveling of the wet film.

In an aspect, the method can include evaporating the solvent present in the wet film using known techniques. The amount of time required to evaporate the solvent can be dependent upon the speed of the web/substrate and the dryer capacity. In an aspect, the temperature of the dryer (not shown) can be less than about 120° C., for example less than about 100° C., and as a further example less than about 80° C.

The wet film deposited using a liquid coating process can be cured using known techniques. In an aspect, the wet film can be cured using a curing agent utilizing at least one of an ultraviolet light, visible light, infrared, or electron beam. Curing can proceed in an inert or ambient atmosphere. In an aspect, the curing step utilizes an ultraviolet light source having a wavelength of about 395 nm. The ultraviolet light source can be applied to the wet film at a dose ranging from about 200 $mJ/cm^2$ to about 1000 $mJ/cm^2$, for example ranging from about 250 $mJ/cm^2$ to about 900 $mJ/cm^2$, and as a further example from about $mJ/cm^2$ to about 850 $mJ/cm^2$.

The wet film can crosslink by known techniques. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization.

A SLML 14, 14' formed using the liquid coating process can exhibit improved optical performance, i.e., be a precision SLML. In some examples, a precision SLML 14, 14' can be understood to mean a SLML having less than about 3% optical thickness variation, about 5% optical thickness variation, or about 7% optical thickness variation across the layer.

In an aspect, the liquid coating process can include adjusting at least one of speed from about 5 to about 100 m/min and a coating gap from about 50 μm to about 100 μm to deposit a wet film from about 2 μm to 10 μm of the selective light modulator layer with a predetermined thickness from about 500 nm to about 1500 nm. In a further aspect, the process can include a speed of 30 m/min, a 75 um gap, 10 um wet film, dry film thickness 1.25 um.

In an example, the SLML includes an alicyclic epoxy resin host using a solvent dye as the SLMM, the reflector includes aluminum.

In an example, the SLML includes an alicyclic epoxy resin host using a diketopyrrolopyrrole insoluble red dye as the SLMP, the reflector includes aluminum.

In an example, the SLML includes an acrylate oligomer resin host using white pigment (Titania) as the SLMP.

In an example, the SLML includes an acrylate oligomer resin host using black IR transparent pigment as the SLML, the reflector includes aluminum.

In another aspect, a leafing agent can be applied as a layer so that a resultant pigment flake can align with its face to a paint surface. The pigment flake can be an asymmetric stack of layers. A pigment with an asymmetric stack and a leafing agent can reduce the material and coating costs; can self-orient in a liquid medium thereby reducing constraints on pigment flake aspect rations; and can be formed using a liquid coating process as described herein.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:
1. An article comprising:
   a reflector having a first surface, a second surface opposite the first surface, and a third surface;
   a first selective light modulator layer external to the first surface of the reflector;
   a first absorber layer external to the first selective light modulator layer; and a second selective light modulator layer external to the first absorber layer;

wherein the third surface of the reflector is open, wherein the article has an asymmetric layer structure, and wherein the first selective light modulator layer comprises a host material, a defoamer and i) an oxygen inhibition mitigation composition or ii) 3-Ethyl-3-hydroxymethyloxetane, the oxygen inhibition mitigation composition comprising at least one acrylate chosen from epoxy acrylates, polyester acrylates, polyether acrylates and urethane acrylates.

2. The article of claim 1, wherein the first selective light modulator layer is at least one of non-absorbing and absorbing.

3. The article of claim 2, wherein the first selective light modulator layer is non-absorbing, and the second selective light modulator layer is absorbing.

4. The article of claim 1, further comprising a magnetic-containing layer having a first surface and a second surface opposite the first surface;

wherein the reflector layer is external to the first surface of the magnetic-containing layer.

5. The article of claim 4, wherein the first selective light modulator layer is non-absorbing.

6. The article of claim 1, further comprising a release layer.

7. An optical device comprising the article of claim 1.

8. A composition comprising the optical device of claim 7 and a liquid medium.

9. The article of claim 1, wherein the article is a flake.

10. The article of claim 1, wherein the first selective light modulator layer selectively absorbs specific wavelengths of energy.

11. The article of claim 1, having a lamellar shape.

12. The article of claim 1, wherein the article exhibits a property chosen from optical interference, light absorption, light reflection, light scattering, and combinations thereof.

13. The article of claim 1, wherein the first selective light modulator layer and the second selective light modulator layer are self-leveled layers independently having a variation in optical thickness of less than about 5%.

14. An article, comprising:

a transparent layer having a first surface, a second surface opposite the first surface, and a third surface; and a first selective light modulating layer external to the first surface of the transparent layer;

wherein the third surface of the transparent layer is open, wherein the article has an asymmetric layer structure, and wherein the first selective light modulator layer comprises a host material, a defoamer and i) an oxygen inhibition mitigation composition or ii) 3-Ethyl-3-hydroxymethyloxetane, the oxygen inhibition mitigation composition comprising at least one acrylate chosen from epoxy acrylates, polyester acrylates, polyether acrylates and urethane acrylates.

15. A method for manufacturing an article comprising:

depositing a reflector layer having a first side and a second side opposite the first side;

depositing a first selective light modulator layer external to the first surface of the reflector layer;

depositing a first absorber layer external to the first selective light modulator layer; and depositing a second light selective light modulator layer external to the first absorber layer;

wherein the article has an asymmetric layer structure, and wherein the first selective light modulator layer and the second selective light modulator layer are deposited using a liquid coating process chosen from a slot die process, a slot-bead process, a slide bead process, a slot curtain process, a slide curtain process, a tensioned web slot process, a gravure process and a roll coating process.

16. The method of claim 15, wherein the first selective light modulator layer is at least one of non-absorbing and absorbing.

17. The method of claim 16, wherein the first selective light modulator layer is non-absorbing.

18. The method of claim 15, wherein the reflector layer is deposited on a substrate, the method further comprising depositing a magnetic-containing layer between the substrate and the reflector layer.

19. The method of claim 18, wherein the first selective light modulator layer is non-absorbing.

20. The method of claim 15, wherein the first selective light modulator layer and the second selective light modulator layer are self-leveled layers independently having a variation in optical thickness of less than about 5%.

* * * * *